United States Patent [19]
Ferreira

[11] Patent Number: 6,028,760
[45] Date of Patent: Feb. 22, 2000

[54] RESONANT POWER CONVERTER FOR ENERGIZING A COIL

[75] Inventor: Jan Abraham Ferreira, Ruiterhof, South Africa

[73] Assignee: Anglo American Corporation of South Africa Limited, South Africa

[21] Appl. No.: 08/965,837

[22] Filed: Nov. 7, 1997

[30] Foreign Application Priority Data

Nov. 7, 1996 [ZA] South Africa .......................... 96/9367

[51] Int. Cl.[7] .................................................. H01H 47/36
[52] U.S. Cl. ........................... 361/190; 361/189; 361/171
[58] Field of Search .................................. 361/156, 159, 361/160, 171, 189, 190, 185, 186; 363/39–41, 132; 307/113–115; 318/293, 294

[56] References Cited

U.S. PATENT DOCUMENTS 4,410,926  10/1983  Hafner et al. ............................. 361/93

FOREIGN PATENT DOCUMENTS 1064584  10/1979  Canada ..................................... 331/58

OTHER PUBLICATIONS

"Invertor Suitable for Operation Over a Range of Frequency", E.E. Ward, Ph.D., *Proceedings The Institution of Electrical Engineers*, vol. 111, No. 8, Aug. 1964, pp. 1423–1434.

"Zero–Voltage–Switching PWM Inverter for High–Frequency DC–AC Power Conversion", Jin He, Ned Mohan and Bill Wold, *IEEE Transactions on Industry Applications*, vol. 29, No. 5, Sep./Oct. 1993, pp. 959–968.

"A Modified C–Dump Converter for Variable Reluctance Machines", A. Hava, V. Blasko and T. A. Lipo, *IEEE* (0–7803–0453–5/91), May, 1991, pp. 886–891.

*Primary Examiner*—Jeffrey Gaffin
*Assistant Examiner*—Kim Huynh
*Attorney, Agent, or Firm*—Blakely, Sokoloff, Taylor & Zafman LLP

[57] ABSTRACT

A pulse generator is provided for energizing a coil with period bipolar current pulses for the purposes of airborne prospecting. The pulses have a generally square waveform, and the pulse generator includes a resonant DC to AC converter circuit including a DC input and an output coupled to the coil. A control circuit is provided for controlling the switching of the converter, and a resonant capacitor is connected in parallel across the DC input. A decoupling diode is provide for decoupling the resonant capacitor from the DC input when the voltage across the resonant capacitor exceeds that of the DC input. The converter includes first and second resonant charging sub-circuits, first and second resonant discharging sub-circuits, first and second freewheeling sub-circuits and first and second exponential charging sub-circuits. The control circuit is arranged to control the amplitude and frequency content of the square waveform by switching the convertor circuit to operate between the above sub-circuit types in at least one controlled switching cycle during unipolar current pulse intervals. The circuit further includes a clamping circuit arranged to supply a substantially constant DC voltage to the coil which is higher than that of the DC input.

24 Claims, 9 Drawing Sheets

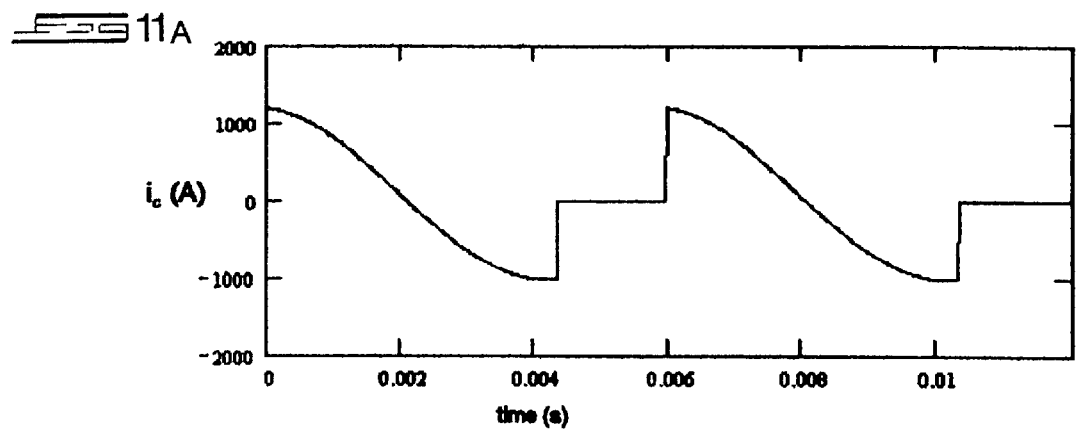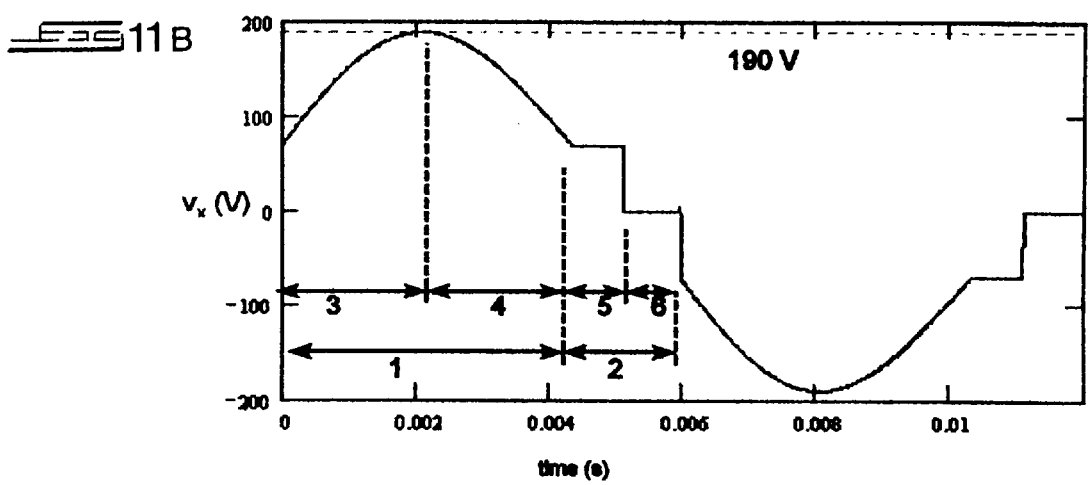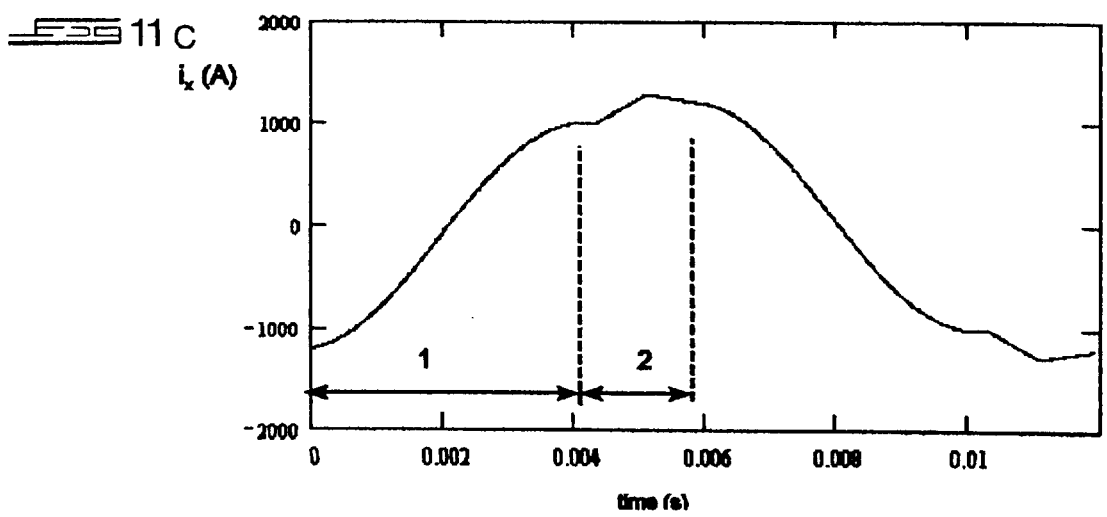

RESONANT POWER CONVERTER FOR ENERGIZING A COIL

BACKGROUND TO THE INVENTION

THIS invention relates to a resonant power converter.

A square wave current signal is a preferred type of transmitted signal for making broadband transient decay measurements which, for instance, are used in airborne electromagnetic prospecting systems. A conventional voltage source inverter having transistors and anti-parallel diodes produces an essentially triangular or exponential current waveforms, and is not the best suited for the application. The current source inverter is better used for this type of application, and has been described in E E Ward, "Inverter suitable for operation over a range of frequency", Proc. IEE, Vol. 111, August 1964. A current source inverter typically requires switches with reverse blocking capability and one or more capacitors in parallel to the load. Forced commutation is generally also a feature of such a circuit, as a result of which thyristors are also required.

In Canadian patent 1064584, a pulse generator is disclosed for airborne electromagnetic prospecting. A coil is energised with periodic bipolar current pulses of predetermined amplitude, period and repetition rate and of generally square waveform. A capacitor is connected in parallel to the coil to form a closed oscillatory circuit of predetermined frequency. The oscillatory circuit is controlled via first and second pairs of controlled rectifiers or alternatively connecting and disconnecting the oscillatory circuit from the direct current source and for alternately reversing the direction of flow of current from the direct current source to the coil during successive current pulses The square wave generated by the pulse generator is relatively inflexible, in that it is only capable of making use of the fixed amplitude and frequency components at a given pulse repetition rate making up the square waveform.

One type of voltage source inverter circuit arrangement where a low value capacitor is placed at the input of a transistor inverter is described by J He, N Mohan and B Wold in "Zero-voltage-switching PWM inverter for high-frequency AC-DC power conversion", IEEE Transactions on Industry Applications, Vol. 29, No. 5, September/October 1993, pp 959–968. In this circuit, it is not possible for the resonant capacitor voltage to become larger than the source voltage. In addition, resonance does not take place between the load and the resonant capacitor, but rather between the capacitor and an auxiliary inductor.

In a further circuit by A Hava, V Blasto and T A Lipo, described in "A modified C-dump converter for variable reluctance machines", 1991 IEEE IAS Conference Record, pp 886–891, unipolar pulses are provided for the windings of a reluctance motor. A smaller capacitor is provided which does not resonate with the load, and the diode in series with the voltage source is not connected to the DC side of the inverter, but rather directly to the load windings.

In applications such as airborne electromagnetic prospecting, it is desirable for there to be relatively flexible control of the electromagnetic signal emanating from the coil or loop.

In U.S. Pat. No. 4,410,926 a circuit is disclosed for generating DC magnetic fields of alternating polarity. A low value capacitor which can resonate with the load is placed at the input of an inverter. However, the wave shape control is very limited and does not give the flexibility which is required for new generation geophysical detection systems. The polarity changes are invariably implemented using relatively slow half wave resonant transitions and the current amplitude is not actively controlled.

SUMMARY OF THE INVENTION

According to a first aspect of the invention there is provided a pulse generator for energizing a coil with periodic bipolar current pulses having a generally square waveform comprising bipolar transition intervals defining successive edges of unipolar current pulse intervals of alternating frequency, the pulse generator comprising a resonant DC to AC converter circuit including a DC input and an output coupled to the coil, a control circuit for controlling the switching of the converter, a resonant capacitor connected in parallel across the DC input, and decoupling means for decoupling the resonant capacitor from the DC input when the voltage across the resonant capacitor exceeds that of the DC input, the converter further including first and second resonant charging sub-circuits in which the capacitor is connected to the coil for allowing the amplitude of the coil current to increase, first and second resonant discharging sub-circuits in which the capacitor is connected to the coil for allowing the amplitude of the coil current to decrease, first and second freewheeling sub-circuits in which the resonant capacitor is effectively isolated from the coil and a short circuit current path is provided for allowing the amplitude of the coil current to gradually decrease, and an exponential charging circuit in which the DC input is connected directly to the coil so as to allow for a rise in current through the coil, the control circuit being arranged to control the amplitude and frequency content of the square waveform by switching the converter circuit to operate between at least two of the above sub-circuit types in at least one controlled switching cycle during the unipolar current pulse intervals.

The invention further provides a pulse generator for energizing a coil with periodic bipolar current pulses having a generally square waveform comprising bipolar transition intervals defining successive edges of unipolar current pulse intervals of alternating frequency, the pulse generator comprising a resonant DC to AC converter circuit including a DC input and an output coupled to the coil, a control circuit for controlling the switching of the converter, a resonant capacitor connected in parallel across the DC input, and decoupling means for decoupling the resonant capacitor from the DC input when the voltage across the resonant capacitor exceeds that of the DC input, the converter circuit further including first and second resonant charging sub-circuits in which the capacitor is connected to the coil for allowing the amplitude of the coil current to increase, first and second resonant discharging sub-circuits in which the capacitor is connected to the coil for allowing the amplitude of the coil current to decrease, an exponential charging circuit in which the DC input is connected directly to the coil so as to allow for a rise in current through the coil, and a clamping circuit shunted across the DC voltage source, the clamping circuit being arranged to supply a substantially constant DC voltage to the coil which is higher than that of the DC input.

Preferably, the pulse generator includes first and second freewheeling sub-circuits in which the resonant capacitor is effectively isolated from the coil and a short circuit current path is provided for allowing the amplitude of the coil current to gradually decrease, the control circuit being arranged to control the amplitude and frequency content of the square waveform by switching the converter circuit to operate between at least two of the sub-circuit types in at least one controlled switching cycle during the unipolar current pulse intervals.

Conveniently, The control circuit is arranged to control the amplitude and frequency content of the square waveform by switching the converter circuit to operate between at least three of the above sub-circuit types in at least one controlled switching cycle during the unipolar current pulse intervals.

Advantageously, the converter comprises a full bridge inverter having first and second switching arms, the first switching arm having first and second controlled switches and the second switching arm having third and fourth controlled switches, with first, second, third and fourth diodes being connected in anti-parallel across the respective first, second, third and fourth controlled switches to provide corresponding first, second, third and fourth switch-diode pairs.

Typically, the first resonant charging sub-circuit comprises the first controlled switch, the coil, the third controlled switch and the resonant capacitor, and the second resonant charging sub-circuit comprises the second controlled switch, the coil, the fourth controlled switch and the resonant capacitor, and the first resonant discharging sub-circuit comprises the second diode, the coil, the fourth diode and the resonant capacitor, and the second resonant discharging sub-circuit comprises the third diode, the coil, the first diode and the resonant capacitor.

The first freewheeling sub-circuit may comprise the first controlled switch, the coil, and the fourth diode, and the second freewheeling sub-circuit comprises the second controlled switch, the coil, and the third diode.

The clamping circuit preferably includes a clamping capacitor and switching means for controlling the operation of the clamping capacitor, the capacitor being sized to supply the substantially constant DC voltage.

Typically, the clamping circuit forms part of a fast exponential charging circuit for charging the coil, and a fast exponential discharging circuit for discharging the coil into the clamping capacitor.

Conveniently, the fast exponential charging circuit comprises the clamping capacitor, a fifth controlled switch forming part of the switching means, the first switch, the coil and the third switch.

Typically, the fast exponential discharging circuit comprises a fly diode in anti-parallel with the fifth controlled switch, the clamping capacitor, the second diode, the coil and the fourth diode.

Advantageously, the fast exponential charging and fast exponential discharging circuits are arranged to operate during the bipolar transition interval, in combination with the resonant charge and discharge circuits.

According to a further aspect of the invention there is provided a method of generating a series of periodic bipolar current pulses having a generally square waveform comprising bipolar transition intervals defining successive edges of uripolar current pulse intervals of alternating frequency, by using a resonant DC to AC converter having a DC input, an output coupled to a coil, and a resonant capacitor connected in parallel across the input and arranged to form a resonant circuit in conjunction with the coil, the method including the steps of controlling the amplitude and frequency content of the square waveform by operating the pulse generator in a resonant charging mode, in which the resonant capacitor is connected to the coil for allowing the amplitude of the coil current to increase, a resonant discharging mode in which the capacitor is connected to the coil for allowing the amplitude of the coil current to decrease, an exponential charging mode, in which the DC input is connected directly to the coil, and a freewheeling mode in which the resonant capacitor is effectively isolated from the coil and a short circuit current path is provided for allowing the amplitude of coil current to gradually decrease.

Preferably, the method includes the step of operating the pulse generator in a fast charging mode in which the coil is charged via a clamping circuit which is connected in parallel across the DC input, and is arranged to supply a substantially constant DC voltage which is higher than the DC input, and a fast exponential discharging mode in which the coil discharges into the clamping circuit.

Advantageously, the method includes the step of clamping the coil voltage, operating the pulse generator in the fast discharging mode by commutating the coil current to the clamping circuit, and subsequently operating the clamping circuit in the fast charging mode when the polarity of the clamping current changes.

Conveniently, the method includes the steps of providing at least one controlled switching cycle during each unipolar pulse interval, each switching cycle including a charging interval, and a discharging interval corresponding to the aforesaid modes.

Typically, each switching cycle further includes fast exponential charging and discharging intervals Conveniently, each switching cycle also includes slow exponential charging and discharging intervals.

Typically, two to five switching cycles are provided, with each cycle being a PWM-controlled cycle.

Advantageously, the method includes the steps of operating the pulse generator, during each bipolar transition interval, in at least the resonant charging and resonant discharging modes.

According to a still further aspect of the invention there is provided a method of generating a series of periodic bipolar current pulses having a generally square waveform comprising bipolar transition intervals defying successive edges of unipolar current pulse intervals of alternating frequency, by using a resonant DC to AC converter having a DC input, an output coupled to a coil, and a resonant capacitor connected in parallel across the input and arranged to form a resonant circuit in conjunction with the coil, the method including the steps of controlling the amplitude and frequency content of the square waveform by operating the pulse generator in a resonant charging mode, in which the resonant capacitor is connected to the coil for allowing the amplitude of the coil current to increase, a resonant discharging mode in which the capacitor is connected to the coil for allowing the amplitude of the coil current to decrease, a fast charging mode in which the coil is charged via a clamping circuit which is connected in parallel across the DC input and a fast discharging mode in which the coil discharges into the clamping circuit.

Preferably, the method includes the steps of operating the pulse generator, during each bipolar transition interval, in at least the resonant discharge, fast exponential discharge, fast exponential charge and resonant charge modes.

Conveniently, the method includes the step of operating the pulse generator, during each bipolar transition interval, in a quiescent mode in which no current flows in the coil, which is effectively disconnected in this mode.

BRIEF DESCRIPTION OF THE DRAWINGS

FIGS. 11A to 11C show capacitor current, coil voltage and coil current waveforms during switch-over in respect of the first embodiment of the DC to AC converter circuit of the invention.

DESCRIPTION OF EMBODIMENTS

Figure 1:
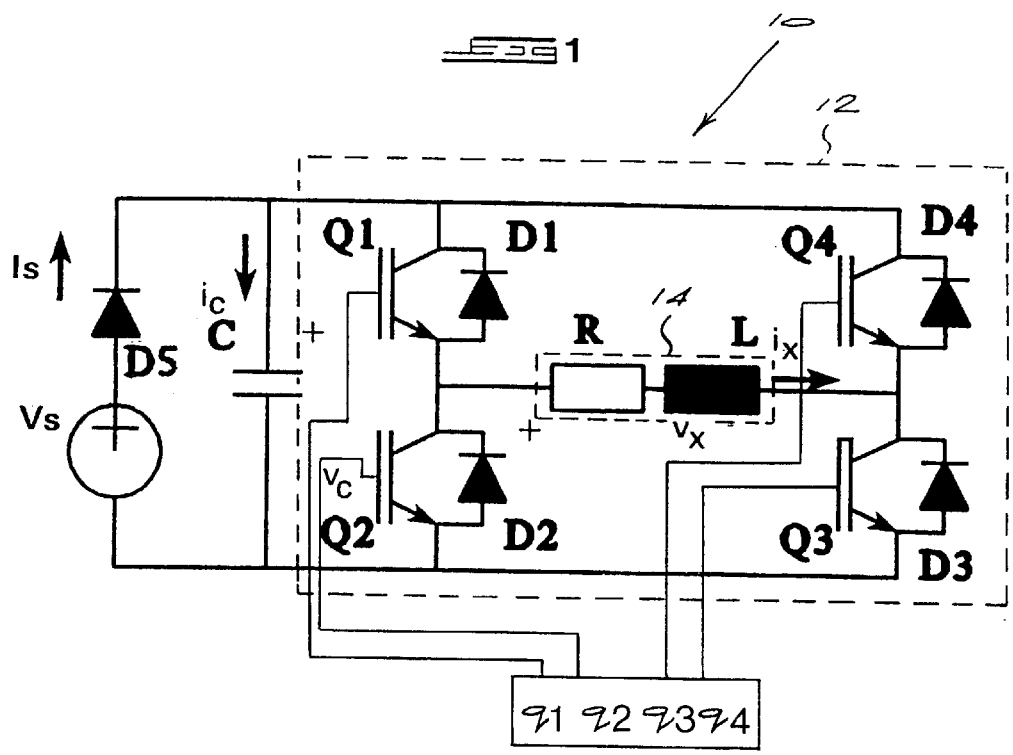
FIG. 1 shows a circuit diagram of a first embodiment of a DC to AC converter circuit of the invention.

Referring first to FIG. 1, a DC to AC converter circuit 10 comprises a full bridge inverter circuit 12 comprising four switches Q1, Q2, Q3 and Q4 having respective diodes D1, D2, D3 and D4 connected in anti-parallel across the switches A coil 14 represented by a resistance R and an inductance L extends between the left and right switching arms defined by the switches Q1 and Q2, and Q3 and Q4. A capacitor C is connected in parallel across the DC voltage source $V_s$ and the input of the full bridge invertor 12. A diode D5 is connected directly to the positive side of the direct voltage source $V_s$, and is arranged to decouple the resonant capacitor C from the direct voltage source when the voltage across the resonant capacitor C is in excess of the DC voltage at the voltage source $V_s$.

The switches Q1, Q2, Q3 and Q4 are fully controllable, and are typically insulated gate bi-polar (IGBT) transistors. Alternatively, the switches are in the form of bi-polar transistors, MOSFETS, gate turn-off thyristors or any similar controlled switching devices. The switches are controlled by means of a control circuit which will be described further on in the specification with reference to FIGS. 7 to 10B.

Figure 2:
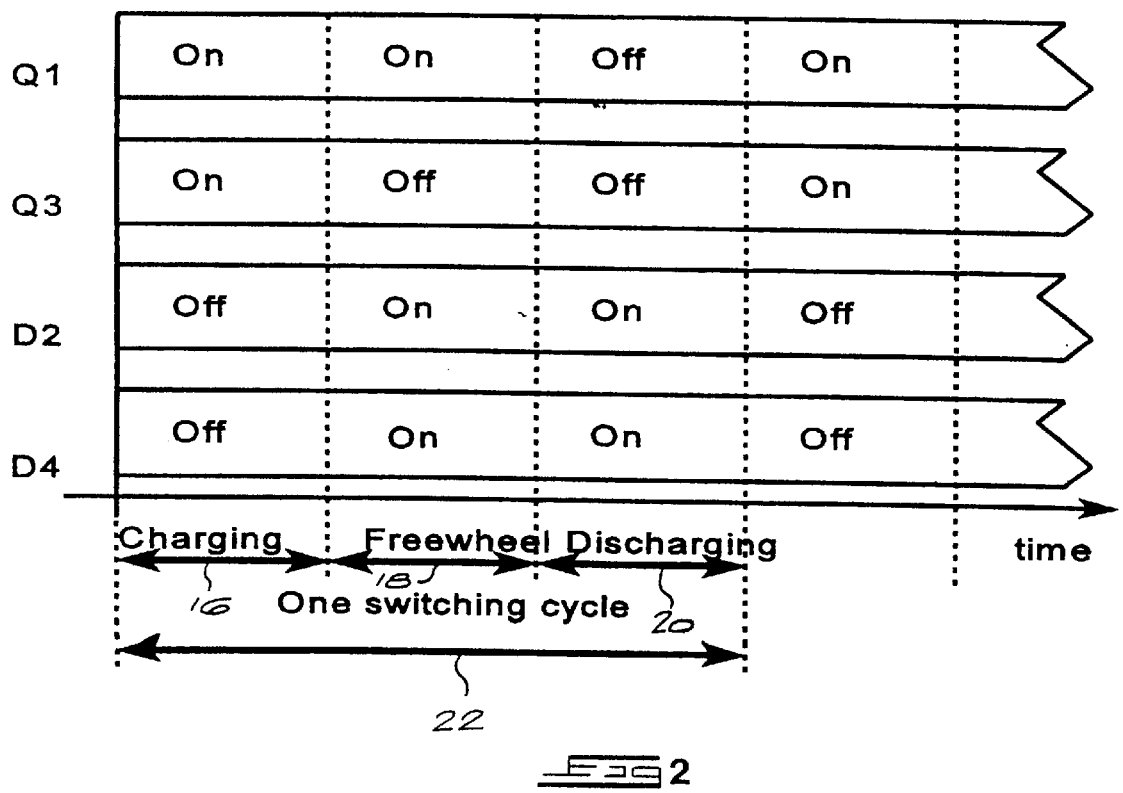
FIG. 2 shows an example of one single positive switching cycle sequence occurring in the circuit of FIG. 1.

Control of the switches Q1 to Q4 results in the circuit having three states for both positive and negative current in the coil 14. These three states are illustrated more clearly in FIG. 2, which represents one positive switching cycle. The first state 16 comprises a charging interval during which two switches, namely Q1 and Q3, are conducting and the diodes D2 and D4 are reversed biased. During this period, the current amplitude increases. A subsequent freewheeling interval 18 occurs when the switch Q1 and the diode D4 are conducting, or the switch Q2 and the diode D3 are conducting. During this period, the current amplitude decreases at a relatively small rate. During a discharging interval 20, the diodes D2 and D4 are conducting a positive coil current, and the switches Q1 and Q3 are turned off.

The charging, freewheeling and discharging intervals 16, 18 and 20 together constitute a single positive switching cycle.

The charging interval 16 is essential to the operation of the inverter as it then draws power from either the voltage source $V_s$ or the resonant capacitor C. The freewheeling and discharging intervals 18 and 20 provide two methods for reducing the current, and either or both of these intervals can be used during circuit operation. This feature of the circuit provides flexibility not only to control the amplitude or waveform of the output current, but also the content and distribution of the frequency spectrum of the waveform, which is particularly important in the generation of a bipolar square wave.

The control range extends between two extremes, one in which the decrease in the coil current is performed solely by the freewheeling interval and the other in which decrease in coil current takes place solely by the discharging interval. Current waveforms corresponding to these two modes of operation are illustrated in FIGS. 3 and 4.

Figure 3:
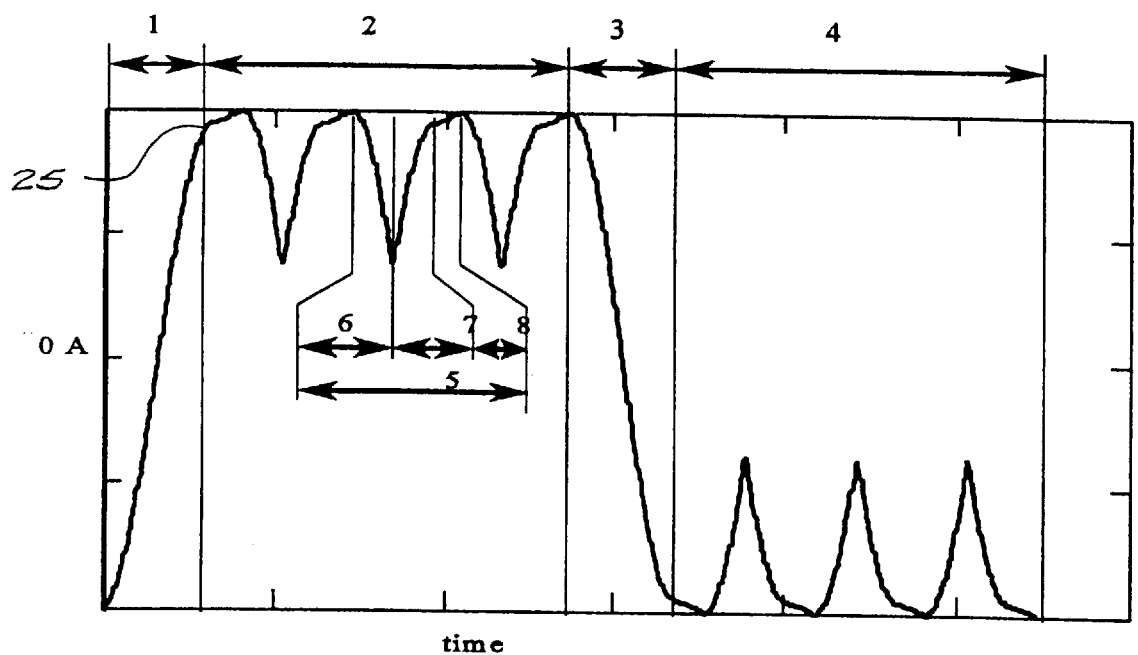
FIG. 3 shows a waveform diagram of a coil current waveform when the freewheeling interval is reduced to zero.
Figure 4:
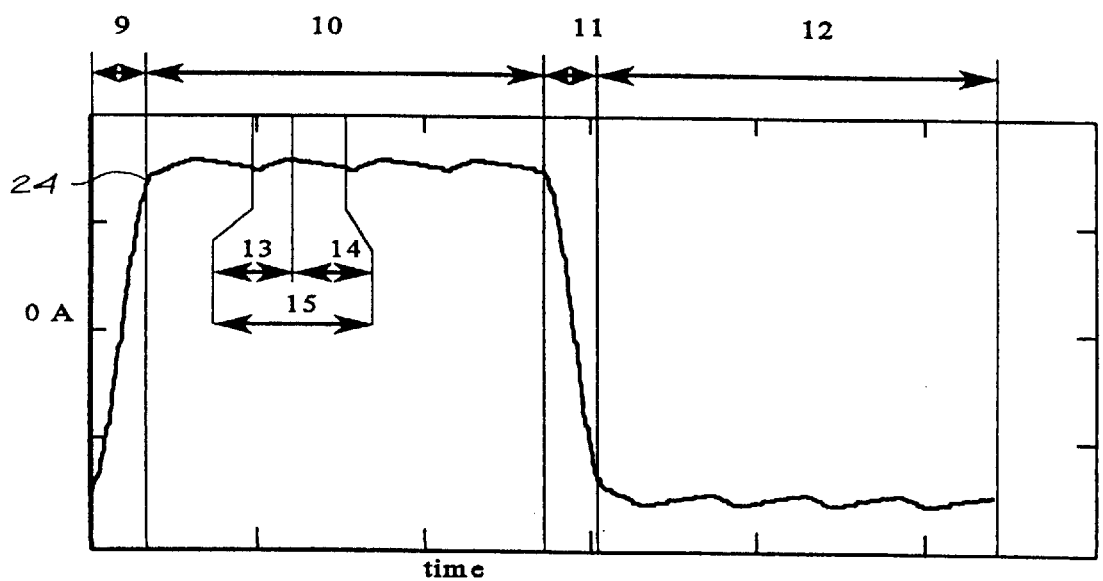
FIG. 4 shows a waveform diagram of a coil current waveform when the discharging interval is reduced to zero.

In the waveform 24 illustrated in FIG. 4, the current crest is almost constant, having a low ripple factor, where the discharging interval is set to zero. The current waveform has a higher AC ripple factor, when the freewheeling interval is set to zero, as is illustrated at 25 in FIG. 3, thereby enhancing the frequency content of the current waveform. Continuous adjustment of the waveform shapes is possible by adjusting the relative weighting of the charging, freewheeling and discharging intervals, together with the number of current pulses in each positive and negative cycle.

The polarity change over intervals 3 and 11 in FIGS. 3 and 4 are initiated by turing all the switches Q1 to Q4 off, and providing a discharge path through the diagonally opposed diodes D2 and D4 or D1 and D3. When the current crosses zero, the switches parallel to the conducting diodes are closed, thereby taking over the current, which is now travelling in the opposite direction. This initiates a resonant charging interval that takes the currents to a value close to the maximum value. This resonant charging interval involves a resonance between the resonant capacitor C and the coil inductance L. The peak voltage across the resonant capacitor C is typically ten times larger than the supply voltage $V_s$. The following equations describe the change over transient for coil voltage $v_x$ and coil current $i_x$:

$$v_x(t) = I_s\left(\frac{1}{\omega_2 C} e^{-\sigma_2 t} \sin(\omega_2 t)\right) + V_s \quad (1)$$

$$i_x(t) = I_s e^{-\sigma_2 t}\left(\cos(\omega_2 t) - \frac{\sigma_2}{\omega_2}\sin(\omega_2 t)\right) \quad (2)$$

where $$\omega_2 = \sqrt{\frac{1}{LC} - \left(\frac{R}{2L}\right)^2} \quad (3)$$

$$\sigma_2 = \frac{R}{2L} \quad (4)$$

and $I_s$ is the current peak of the approximate square wave.

Pulse width modulation is applied to control the current amplitude and ripple on the crest of the positive and negative parts of the square wave during intervals 2, 4, 10 and 12. Interval 15 is a positive switching cycle comprising two sub-intervals, namely intervals 13 and 14. Interval 13 is a charging interval and interval 14 is a freewheeling interval, both intervals being of the type illustrated at 10 and 12 in FIG. 2, which also indicate which devices are conducting in the circuit. The various numbered intervals can be summarised as follows:

Intervals 1, 3: Current polarity change over

Intervals 2, 4: Pulse width modulation

Interval 5: One pulse width modulation switching cycle

Interval 6: Resonant discharging of the coil

Interval 7: Resonant charging of the coil from capacitor

Interval 8: Slow exponential charging of the coil from voltage source

Intervals 9, 11: Current polanty change over

Intervals 10, 12: Pulse width modulation

Interval 13: Slow exponential charging of the coil from voltage source

Interval 14: Freewheeling (slow exponential discharging)

Interval 15: One pulse width modulation positive switching cycle

The waveforms of the slow exponential charging intervals 13 and 8 from the voltage source are given by the following equations:

$$v_x(t) = V_s \quad (5)$$

$$i_x(t, I_x) = \frac{V_s}{R} + \left(I_x - \frac{V_s}{R}\right)e^{-\sigma_1 t} \quad (6)$$

where $I_x$ is the coil current at the beginning of the interval.

During the freewheeling or slow exponential discharging interval 14 of FIG. 4, almost zero volts is applied to the coil 14 This allows for the conduction losses of the diode D4 and the switch Q1, or diode D2 and switch Q3, depending on which diode/switch pair is operating. The waveforms during this interval are given by the following equations:

$$v_x(t) = O \quad (7)$$

$$i_x(t, I_x) = I_x e^{-\sigma_1 t} \quad (8)$$

where $$\sigma_1 = \frac{R}{L}$$

Interval 5 is a positive current switching cycle, when the freewheeling interval is reduced to zero using only the resonant discharging interval to reduce the current during pulse width modulation control. The resonant discharging interval 6 can be described by the previous resonant charging equations (1) and (2).

Intervals 7 and 8 are respective resonant and exponential charging intervals corresponding to switches Q1 and Q3 conducting during the positive part of the cycle, and similarly switches Q2 and Q4 conducting during the negative part thereof. Interval 8 occurs when the input voltage to the inverter bridge 12 is equal to the supply voltage $V_s$, and equations (5) and (6) describe the voltage and current waveforms over this period. During interval 7 when the load 14 is charged from the resonant capacitor C, the impedance R+jωL of the coil load resonates with the capacitor C, and the waveforms are given by the following equations:

$$v_x(t, V_x, I_x) = V_s + A(V_x, I_x)e^{-\sigma_2 t}\sin(\omega_2 t + \phi(V, I)) \quad (9)$$

$$i_x(\tau, V_x, I_x) = \quad (10)$$
$$A(V_x, I_x)C\omega_2 e^{-\sigma_2 t}\left(\cos(\omega_2 t + \phi(V_x, I_x)) - \frac{\sigma_2}{\omega_2}\sin(\omega_2 t + \phi(V_x, I_x))\right)$$

where $$\phi(V_x, I_x) = \operatorname{atan}\left[\left[\frac{-I_x}{\omega_2 C(V_x - V_s)} + \frac{\sigma_2}{\omega_2}\right]^{-1}\right] \quad (11)$$

$$A(V_x, I_x) = \frac{V_x - V_s}{\sin(\phi(V_x, I_x))} \quad (12)$$

with $V_x$ and $I_x$ being the initial load voltage and current.

The waveforms shown in FIGS. 3 to 6 are applicable when a number of switching intervals exist for each positive and negative half cycle of the coil current. These switching intervals provide a means to control the coil current amplitude. However in cases where the resistance of the coil is large enough to limit the coil current to a suitable level, or alternatively, when the value of the supply voltage is controlled to limit the coil current to a suitable level, it is possible to have only one charge and discharge interval per positive and negative half cycle of the coil current.

Figure 5:
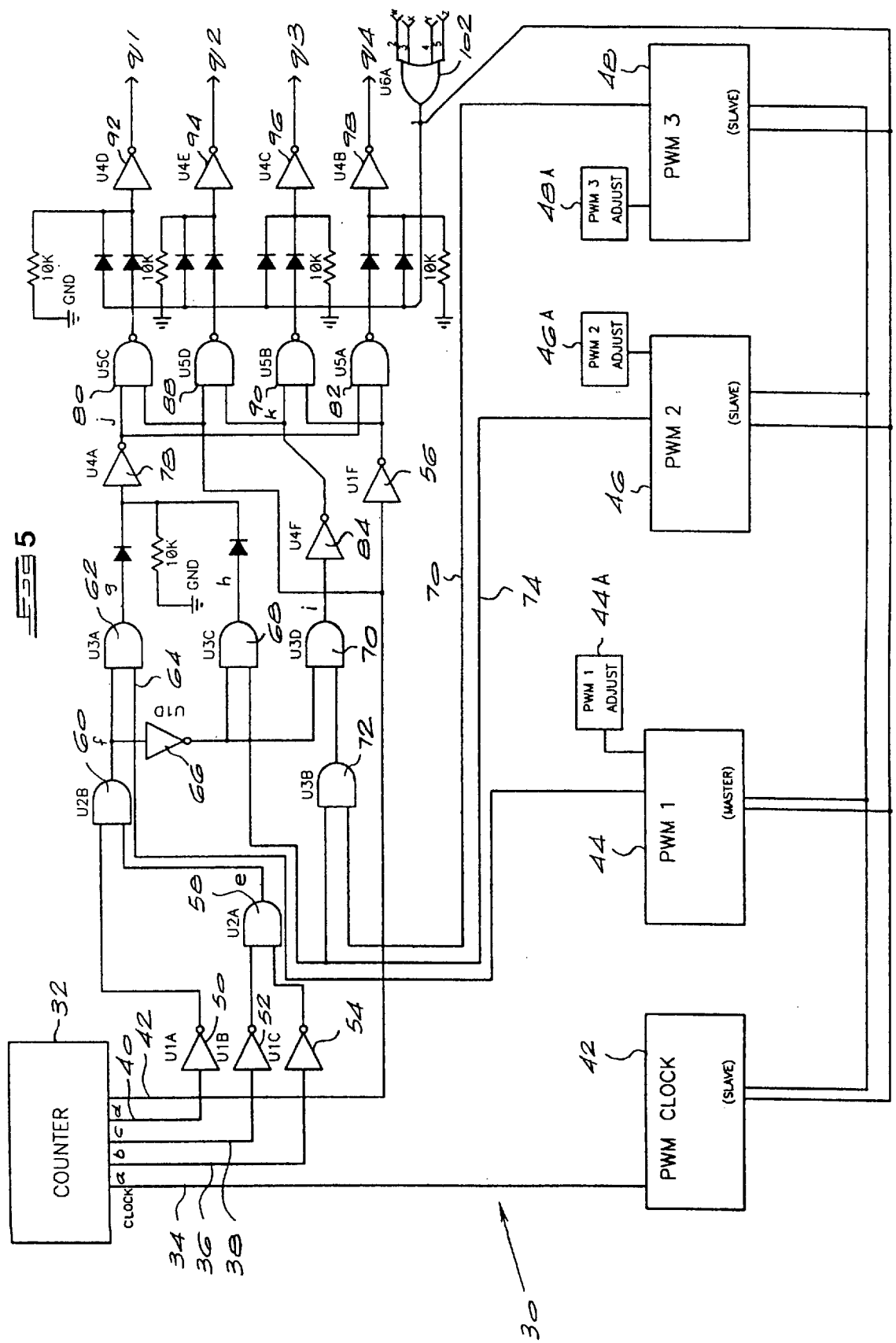
FIG. 5 shows a partly schematic circuit diagram of an analogue control circuit for controlling the DC to AC converter circuit of FIG. 1.
Figure 6:
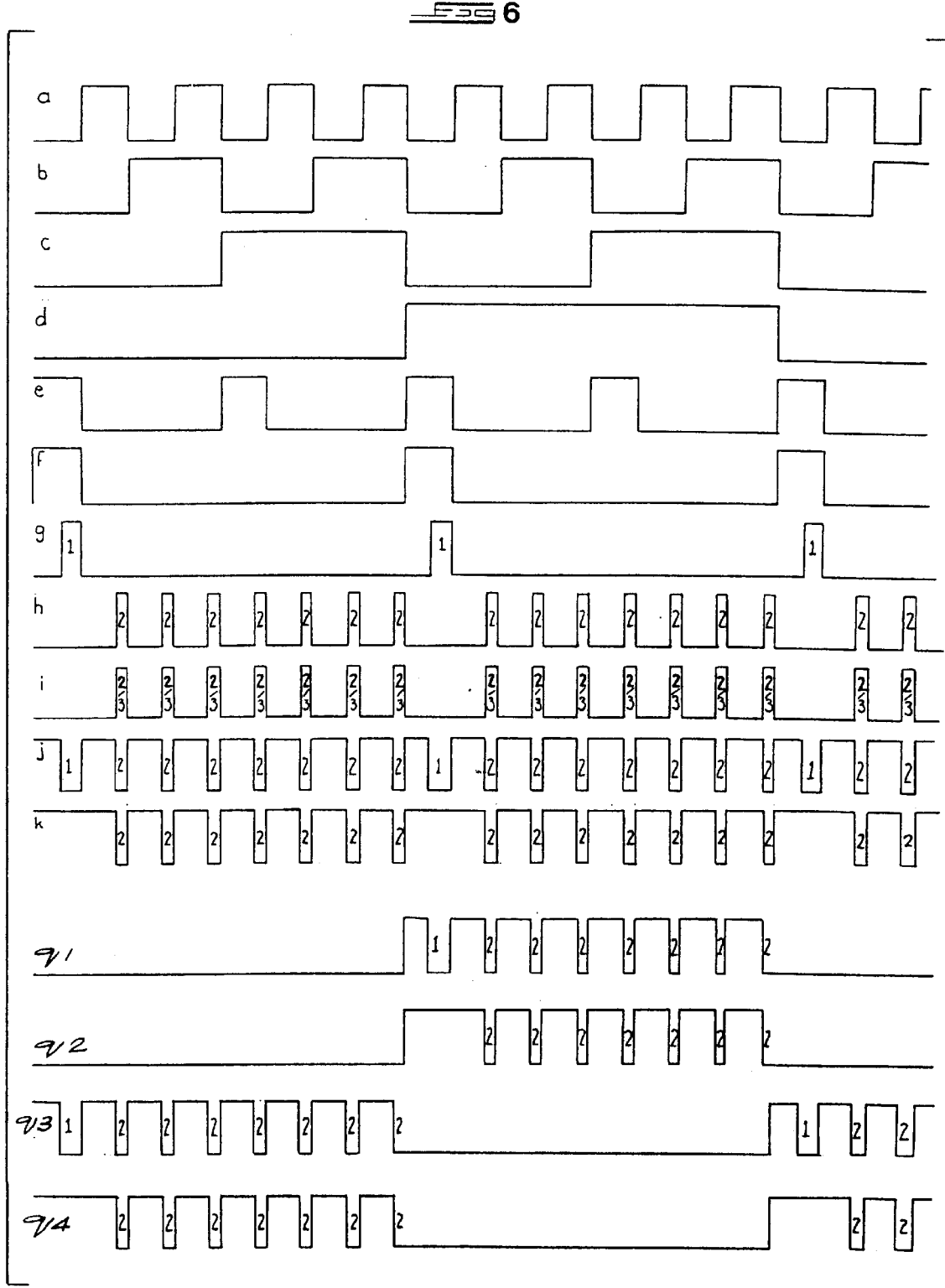
FIGS. 6 & 6A show various logic waveform diagrams occurring at various numbered positions in the control circuit of FIG. 5.
Figure 6A:
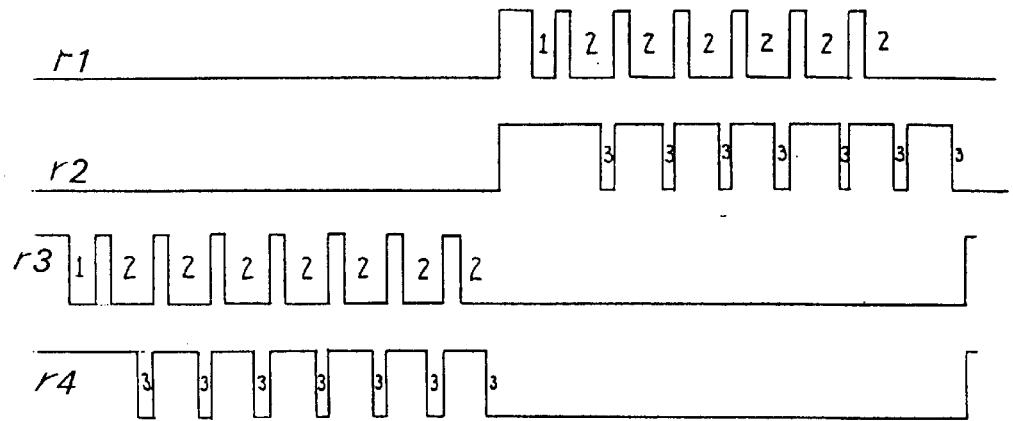

Referring now to FIG. 5, an analogue control circuit 30 is shown for providing independent control of the change over interval, as well as continuous adjustment of the ratio between the charging and freewheeling intervals. Alternatively and preferably, the control pulses can be generated by means of a micro-controller. The analogue control circuit 30 comprises an 8 bit binary counter 32 having a clock input line 34 and output lines 36, 38, 40 and 42 used to realise the waveforms a, b, c and d in FIG. 8. The counter clock is derived via the clock input line 34 from a PWM clock 42, which is in turn slaved from a master PWM controller 44. The PWM controller 44, which is denoted as PWM 1, is also master to two additional PWM controllers 46 and 48, indicated as PWM2 and PWM3 respectively. The master-slave arrangement in which the PWM master controller 44 controls the timing of the counter 32 as well as the other slave PWM controllers 42, 46 and 48, ensures that all he PWM waveforms have the same frequency and are in phase with one another and with the counter 32. The width of the PWM pulses at the PWM controllers PWM1, PWM2 and PWM3 are adjusted by respective pot's 44A, 46A and 48A.

The outputs 36, 38, 40 and 42 are inverted at NOT gates 50, 52, 54 and 56 respectively, with the inverted outputs from the NOT gates 52 and 54 forming the inputs of an AND gate 58. The output of the AND gate 58 in turn forms the input of a further AND gate 60, which also receives an input from the NOT gate 50. The output from the AND gate 60 is in turn fed to the input of an AND gate 62, which also receives an input 64 from the PWM master controller 44.

Waveforms e and f, which represent the outputs from the respective AND gates 58 and 60, show how the waveforms a, b and c are used to develop a pulse sequence of which only one of eight parts is on and the other seven of the eight parts are off. The output waveform f is inverted by means of a NOT gate 66, and the inverted waveform is then passed on as an input to AND gates 68 and 70. The AND gate 70 has as its other input an output from an AND gate 72, which in turn receives inputs via input lines 74 and 76 from the PWM controllers PWM2 and PWM3. The PWM2 output line 74 also feeds the AND gate 68 with the output waveforms g, h and i representing the outputs from the respective AND gates 62, 68 and 70. The output waveforms g and h are combined and inverted at a NOT gate 78 so as to provide a combined inverted output waveform j, which forms an input of the NAND gates 80 and 82. The output waveform i from the AND gate 70 is inverted so as to provide the output waveform k, which is in turn fed to inputs of respective NAND gates 88 and 90. The output signals from the NAND gates 80, 88, 90 and 82 are inverted at respective NOT gates 92, 94, 96 and 98, at which stage they become the PWM control signals indicated by the waveforms q1, q2, q3 and q4 for switching the respective switches Q1, Q2, Q3 and Q4. Each switching cycle can be broken up into sixteen parts, of which eight parts is always on and the other eight parts is either always or only partially on, depending on how the pulse width modulators are set.

Figure 9A:
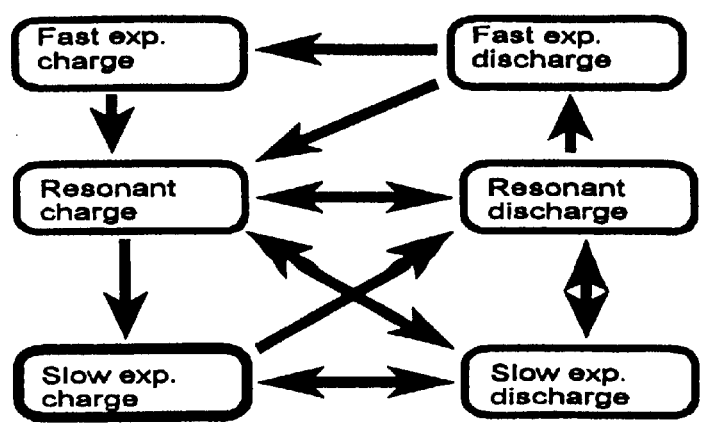
FIG. 9A shows a state diagram illustrating all of the possible transition states between the conduction modes illustrated in FIG. 8 within a particular switching cycle.

The four different pulse sequence switching cycles illustrated at q1 to q4 are in respect of a particular example in which the pulse width of PWM2 is smaller than that of PWM3, as a result of which PWM2 dominates. In FIG. 9A, another example is given of output waveforms r1, r2, r3 and r4 to show what happens when the pulse width of PWM3 is smaller than that of PWM2.

It is clear from the waveforms q1 to q4 and r1 to r4 that there are only two different pulse sequences, and that q3 and q4 on the one hand and r3 and r4 on the other hand represent the same respective sequences as q1 and q2, and r1 and r2, but moved 180° out of phase. This is to ensure that the two switches in each phase arm of the four converters will never be on at the same time.

By looking at the final outputs of the control circuit 30, it is clear that by setting PWM1, the first part of the eight partially on portions of two of the pulse sequences are set. The other seven parts are set using PWM2. The other two pulse sequences r1 and r2 are fully on for the first of each of the eight on parts and the other seven parts are set by setting PW4 and PWM3, with the greater of the two pulse widths dominating (in actual fact, the smallest pulse width will dominate, but the inverse of the PWM pulses is being used).

In the circuit, the PWM clock chip 42 controls the number of pulses in respect of a full cycle of a square wave comprising intervals 1 to 4 in FIG. 3 or intervals 9 to 12 in FIG. 4. A maximum of 16 pulses per complete cycle is possible, with 8 pulses per positive and negative half cycle. The PWM1 controller 44 controls the duration of the transitional polarity change-over intervals 1 and 3 or 9 and 11. The PWM controllers PWM2 and PWM3 effectively control the extent of the current "ripple" on the crest denoted by intervals 2 and 4 in FIGS. 3 and 10 and 12 in FIG. 4. This is achieved by adjusting the relative length of the charging, freewheeling and discharging intervals over each switching cycle. By adjusting the relative lengths of the charging intervals, the magnitude of the waveform may be varied, as is clear from FIGS. 3 and 4.

Figure 7:
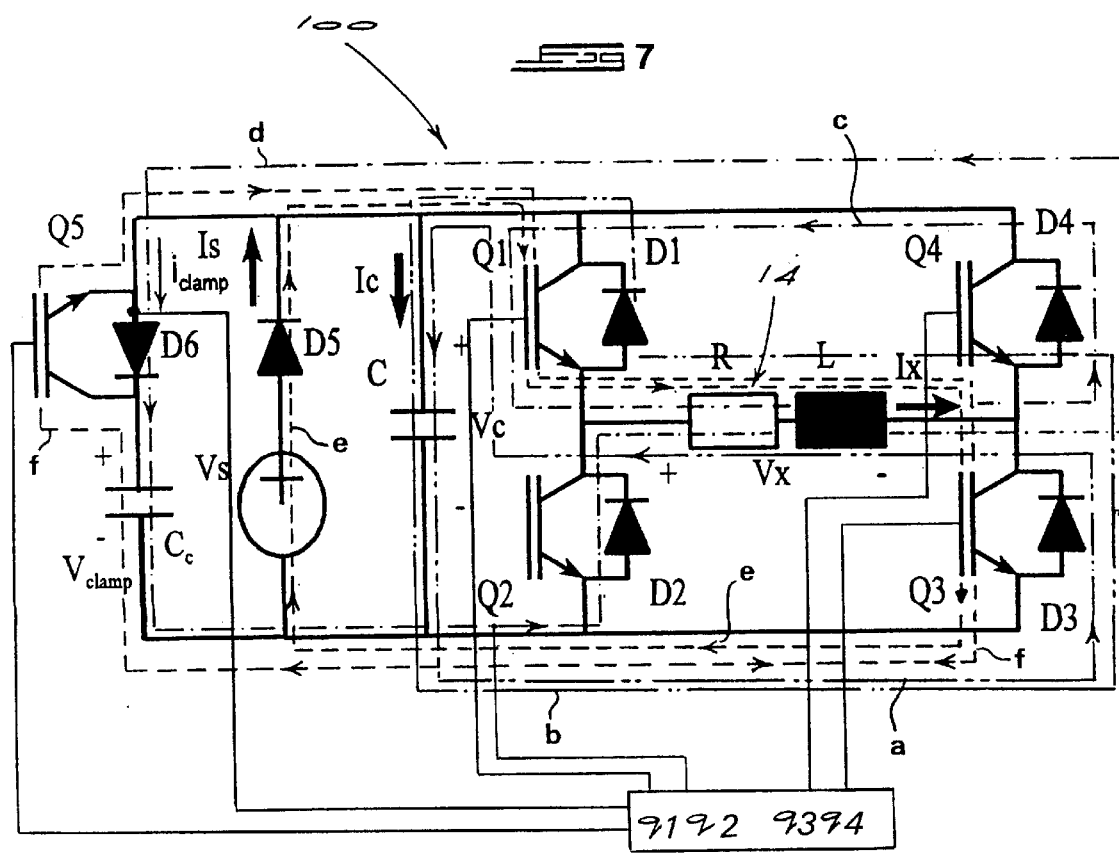
FIG. 7 shows a circuit diagram of a second embodiment of a DC to AC converter circuit of the invention.

Referring now to FIG. 7, a second embodiment of a DC to AC converter circuit 100 is shown. This is in most respects identical to the circuit of FIG. 1, with the addition of a clamping capacitor $C_c$ shunted across the DC voltage source $V_s$ in series with a diode D6, which is connected in anti-parallel with a switch Q5. The provision of the switch Q5, the anti-parallel diode D6 and the clamping capacitor $C_c$, which effectively operate as a second DC voltage source having a higher DC voltage (190V) than the first DC voltage source (70V), allows for two additional modes of operation. These are a fast exponential charge mode in which the load is charged from the clamping capacitor via the switch Q5, and a fast exponential discharge mode in which the load discharges into the clamping capacitor $C_c$ via the diode D6. The converter circuit 100 controls the current in the magnetic field coil 14, applying a sequence of the following specific intervals, which are described in more detail below:

a) A resonant charging interval, which involves a resonance in which the frequency is substantially smaller than the repetition rate of the waveform, which occurs between the coil inductance and the capacitor, and during which the amplitude of the coil current is increased.

b) A resonant discharging interval, which involves a resonance which is opposite to that in a), in that the amplitude of the coil current is decreased c) A slow exponential discharge or freewheeling interval, during which a short circuit is applied across the coil 14, resulting in a slow exponential decay of the current.

d) A fast exponential discharge interval, during which the clamping voltage of capacitor $C_c$ is applied across the coil, resulting in a fast exponential decay of the current arising from the application of a higher voltage (190V) than the DC input voltage of 70V.

e) A slow exponential charging interval during which the supply voltage is applied to the coil, resulting in a slow exponential rise of the current.

f) A fast exponential charging interval during which the clamp voltage is applied to the coil, resulting in a fast exponential rise of the current.

g) A quiescent state during which no current flows in the coil and coil is effectively disconnected.

Figure 8:
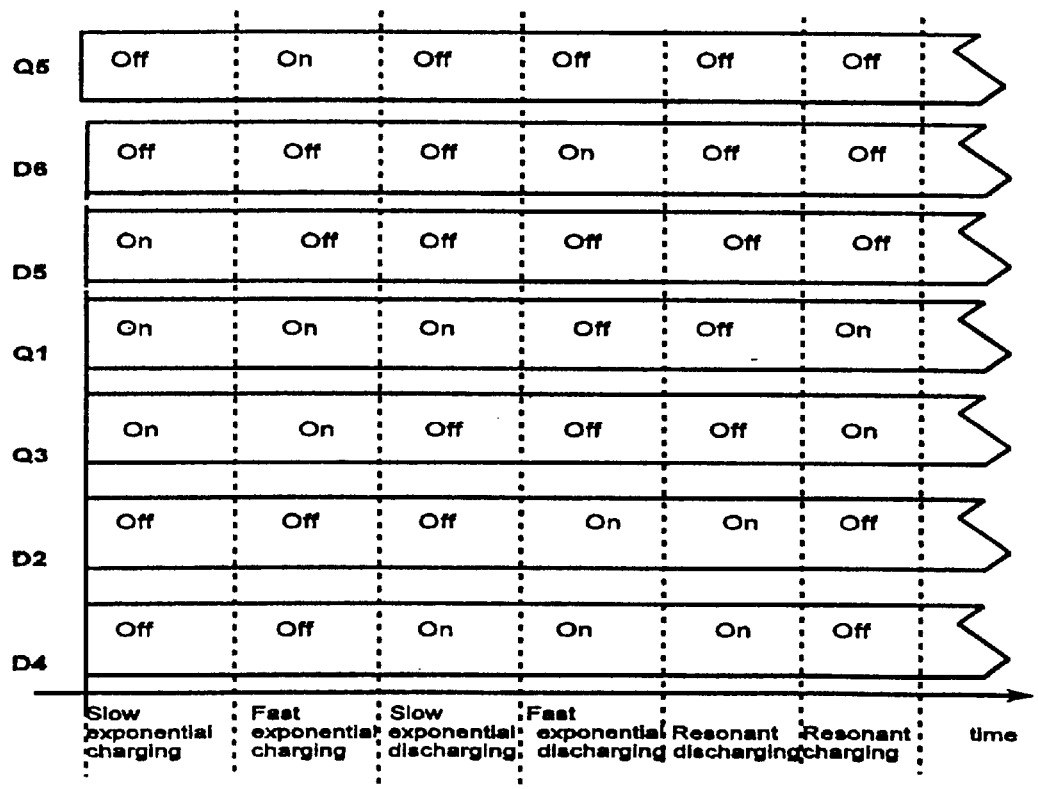
FIG. 8 shows a table of various possible conduction modes in respect of a single positive switching cycle for positive current $I_x$.

FIGS. 7 and 8 illustrate the various current paths in the circuit diagram and the states of the diodes and switches corresponding to the various conduction modes or intervals a) to g) above. These current paths constitute a first set of sub-circuits making up the main converter circuit in respect of a positive current cycle. In a negative current cycle, the current direction is reversed and switches Q2 and Q4 and diodes D1 and D3 come into operation. The conduction modes are thus identical to those illustrated in FIGS. 7 and 8, save that switches Q1 and Q3 are replaced by respective switches Q2 and Q4, and diodes D2 and D4 are replaced by respective diodes D1 and D3, which make up a second set of sub-circuits operating in identical modes, but with the diodes and switches carrying current in the opposite direction. In the freewheel mode, the first freewheel circuit may be constituted either by current path c), or by a current path constituted by diode D2, coil 14 and switch Q3. Similarly, the second freewheel current circuit may comprise, with coil 14, either switch Q4 and diode D1 or switch Q2 and diode D3.

The current in the coil is cycled between a positive current cycle and a negative current cycle. During either the positive or negative cycle the current is controlled by applying the above intervals in a sequential manner in order to control the amplitude and the frequency content of the waveform. The state diagram of FIG. 9A indicates all the possible switching sequences between various modes within a PWM-controlled unipolar switching cycle. Note that the dead or quiescent interval is not used.

Figure 9B:
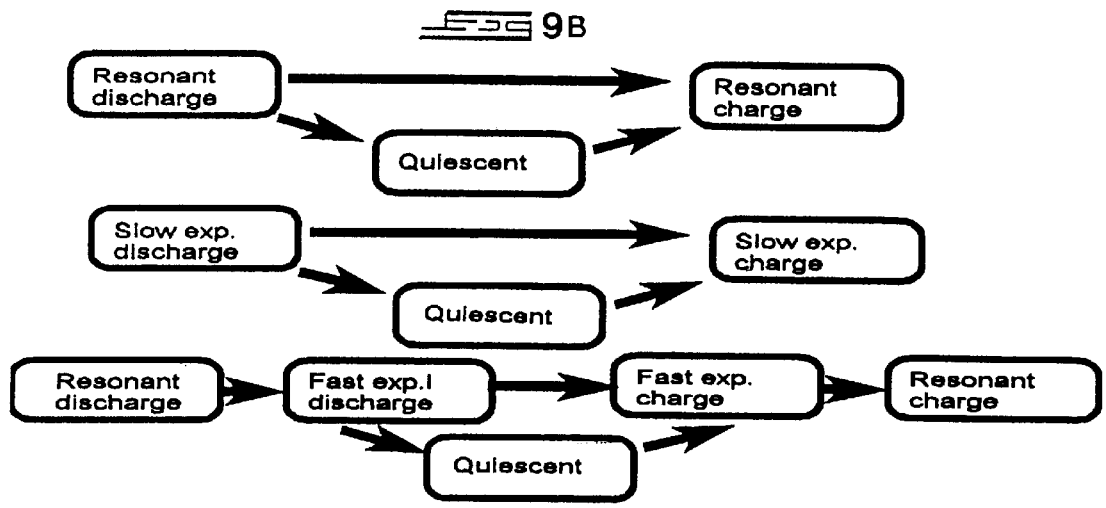
FIG. 9B shows state diagrams of the various possible transition states between conduction modes within a current polarity change-over interval.

Referring now to FIG. 9B, when the current in the coil is changed from positive to negative or vice versa, in a current polarity transition interval, can be achieved by applying a resonant discharge followed by an optional quiescent state, followed by a resonant charge interval. Alternatively the polarity can be changed by using a slow exponential discharge interval followed by an optional quiescent interval, followed by a slow exponential charge interval. The third option gives the fastest polarity change for a given voltage stress on the devices and consists of resonant discharge, followed by a fast exponential discharge, a fast exponential charge and a resonant charging interval.

The various intervals referred to above will now be described in mathematical terms. More states and a larger number of interactions between states are introduced in this second embodiment. Consequently, a set of equations are presented that are more general and more flexible.

Resonant Charging Interval

During the resonant charging interval the coal inductance L is charged by the resonant capacitor C, and the current is supplied from the capacitor C to the coil L through switches Q1 and Q3. Similarly, the negative current is conducted by switches Q2 and Q4.

The current and voltage waveforms for this interval are given by the following equations which are essentially similar to but more generalized than equations (2) and (1) respectively.

$$i_x(t) = e^{-\sigma_2 t}\left(i_s(0)\cos(\omega_2 t) + \left(\frac{v_x(0) - Li_x(0)\sigma_2}{L\omega_2}\right)\sin(\omega_2 t)\right) \quad (13)$$

$$v_x(t) = e^{-\sigma_2 t}\left(v_x(0)\cos(\omega_2 t) - \left(\frac{i_x(0) - Cv_x(0)\sigma_2}{C\omega_2}\right)\sin(\omega_2 t)\right) \quad (14)$$

where $\omega_2$ and $\sigma_2$ are defined in equations (3) and (4).

The coil current $I_x$ in this interval increases while the voltage, $V_x$, decreases.

Slow Exponential Charging Interval

This interval also involves conduction of two switches, similar to the resonant charging interval. Instead of discharging capacitor C, current is drawn from the voltage source and D5 conducts.

The waveforms for this interval when switches Q1 and Q3 are conducting, are given by previous equations (5) and (6).

Fast Exponential Discharging

This interval is similar to slow exponential charging interval, and the only difference is that $V_{clamp}$ instead of $V_s$ is applied to the coil. Q5 is connects capacitor $C_c$ to the transistor bridge and switches Q1 and Q3, or Q2 and Q4 are switched on.

The waveforms are described by previous equations (5) and (6), but replacing $V_s$ by $V_{clamp}$.

Slow Exponential Discharging (Freewheeling)

This has already been described with reference to interval 14 of FIG. 4 in equations (7) and (8).

Resonant Discharging

This is given the following equations, which are essentially identical to equations (13) and (14), save for the change in polarity.

$$i_x(t) = e^{-\sigma_2 t}\left(i_x(0)\cos(\omega_2 t) - \left(\frac{v_x(0) + Li_x(0)\sigma_2}{L\omega_2}\right)\sin(\omega_2 t)\right) \quad (15)$$

$$v_x(t) = e^{-\sigma_2 t}\left(v_x(0)\cos(\omega_2 t) - \left(\frac{i_x(0) + Cv_x(0)\sigma_2}{C\omega_2}\right)\sin(\omega_2 t)\right) \quad (16)$$

As soon as all the switches are turned off the decrease of current proceeds at an increasing rate, due to an increasing negative voltage that is applied to the coil L. For the positive current PWM cycle the current will be conducted by diodes D2 and D4, whereas for the negative PWM cycle diodes D1 and D3 will be conducting.

As can be seen from equation (16), the voltage over the coil L is negative and this explains the decreasing current indicated by equation (15).

Fast Exponential Discharging

This interval prevents the voltage over the resonant capacitor C from rising above the value $V_{clamp}$. The inductor to discharge exponentially into the large capacitor $C_c$.

The wave waveforms for this interval are given by the following equations:

$$v_x(t) = -V_{clamp} \quad (17)$$

$$i_x(t) = \left(i_x(0) + \frac{V_{clamp}}{R}\right)e^{-\sigma_1 t} - \left(\frac{V_{clamp}}{R}\right) \quad (18)$$

Figure 10:
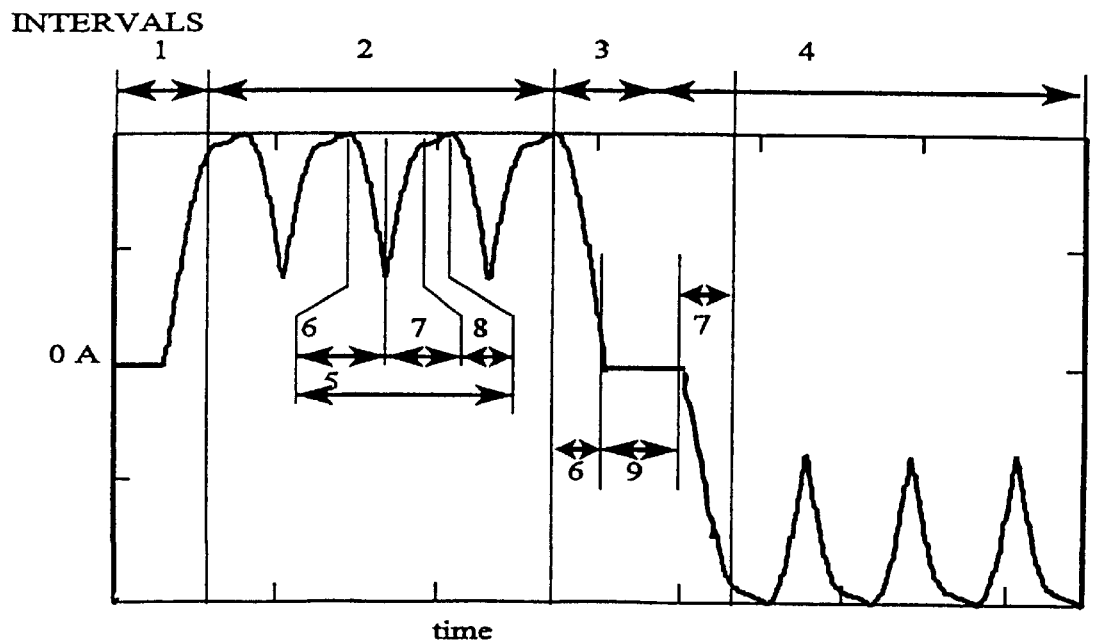
FIG. 10 shows a waveform diagram of a coil current waveform using quiescent, charge and discharge intervals.
Figure 12A:
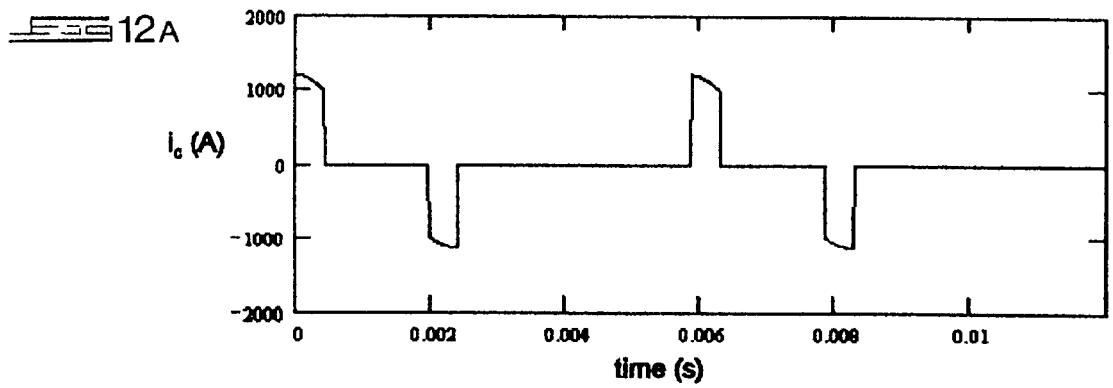
FIGS. 12A to 12D show capacitor current, coil voltage, coil current and clamping current waveforms in respect of the second embodiment of the DC to AC clamped converter circuit of FIG. 7.
Figure 12B:
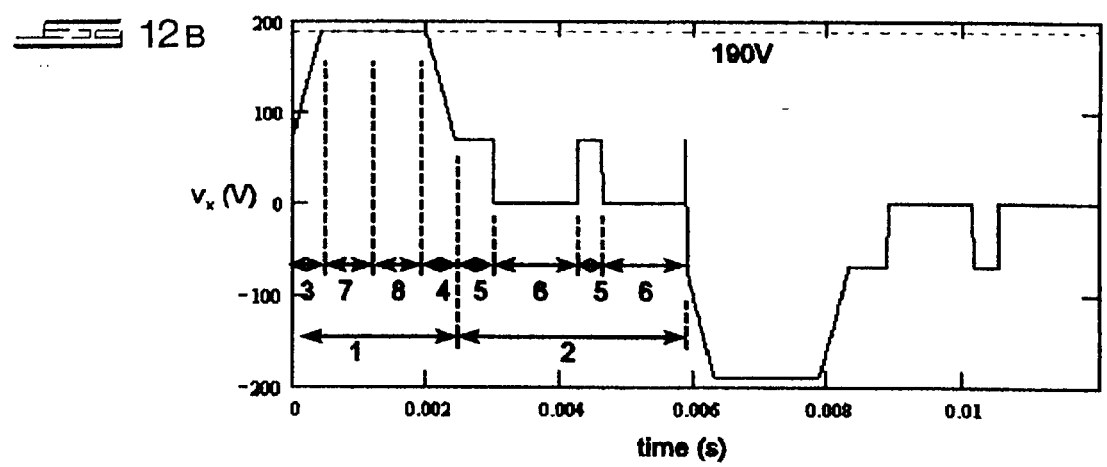
Figure 12C:
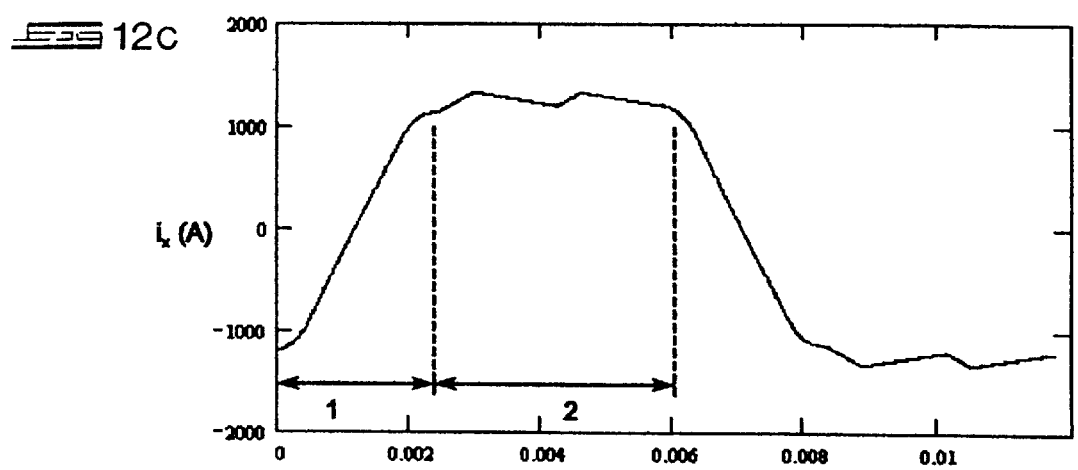
Figure 12D:
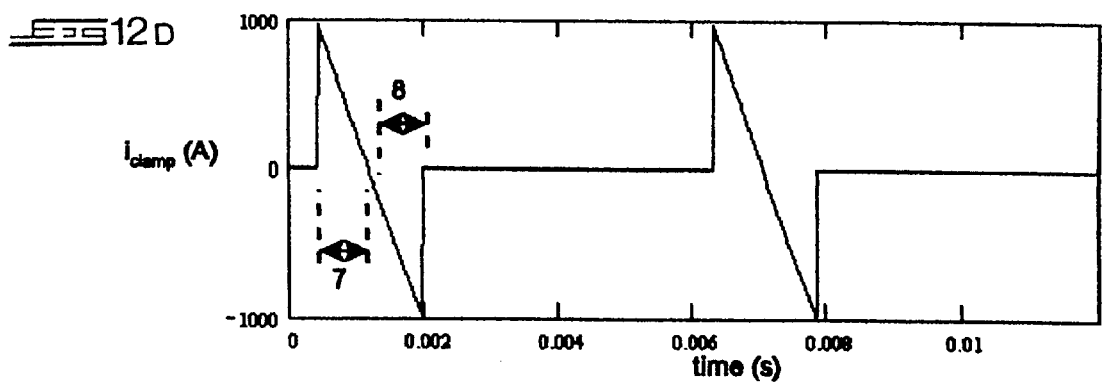

Referring now to FIG. 10, which is similar to FIG. 3, a coil current waveform diagram is shown in which the quiescent interval 9 is used during the current polarity change-over interval 3 so as to provide an optional variable dead time between positive and negative pulses. The quiescent interval is preceded by a resonant discharge interval 6, and is followed by a resonant charge interval 7.

Referring now to FIGS. 11A to 11C, respective waveform diagrams of capacitor current, coil voltage and coil current are shown in respect of the first embodiment of the converter, in which R=0.0124Ω, C=12.8 mF, and L=150 mH. The change-over interval 1 comprises a resonant discharge interval 3 followed by a resonant charge interval 4. A simple PWM interval 2 comprises only a single slow exponential charge interval 5 followed by a slow exponential discharge interval 6. At the onset of the change-over interval, the coil current $I_x$ is switched to flow into the capacitor C. The initial coil voltage $V_x$ increases from 70 volts to a maximum of 190 volts as the current amplitude decreases. When the capacitor current reaches zero, this signals the start of a resonant charge interval in which the amplitude of the coil and capacitor currents increase and the coil voltage drops back towards 70 volts. When the current has fully changed polarity, the current amplitude will be slightly smaller than it was prior to the current change-over interval due to losses in the circuit. As a result, the unipolar PWM interval 2 commences with a slow exponential charging interval to restore the current amplitude, followed by a slow exponential charging interval to complete a single PWM cycle.

Referring now to FIGS. 12A to 12D, the current and voltage waveforms in respect of a clamped circuit of the type illustrated in FIG. 7 are shown. When the coil voltage reaches the clamp voltage level of 190 volts, the capacitor current stops flowing in the capacitor and commutates to the clamping circuit during the transition from a resonant discharge interval 3 to a fast exponential discharge interval. When the clamping current flows the diode D6 conducts and the clamping capacitor absorbs energy from the coil, resulting in fast exponential discharge interval 7. When the polarity of the clamping current changes, a switch Q5 takes over the conduction from diode D6 and the clamping capacitor discharges back into the coil during the fast exponential charging interval 8. During his time the current amplitude increases to almost the same but the opposite value as it was at the onset of the clamped interval. The effect of the clamping sub-circuit constituted by the clamping capacitor $C_c$, the switch Q5 and the anti-parallel diode D6 results in a significant increase in change-over time. In this converter circuit, the resistance and the inductance remained unchanged, the capacitance of capacitor C was 4 mF, the capacitance of clamping capacitor was 100 mF, and the clamping voltage was 190 volts. The resultant change-over interval was reduced from 4.36 ms to 2.43 ms The control circuit supplying gate pulses to Q5 will typically measure the current when diode D6 starts to conduct, and will turn off switch Q5 when its current reaches the same value, in order to achieve charge balance in clamping capacitor $C_c$. The value of the clamping voltage on the capacitor $C_c$ is adjusted by varying the turn-off current of switch Q5, making it either slightly larger or suer than the turn-on current of mode D6.

The exceptional versatility of the circuit finds a particular application in airborne electromagnetic prospecting systems, as it allows for extensive control of both the amplitude and frequency content of the transmitted waveform, to the extent that the magnitude of individual frequency components in the waveform can be controlled so as to achieve the optimum transmitted magnitude and frequency components of a substantially square waveform for a particular prospecting application. In particular, higher frequency components, the magnitude of which are inversely suppressed as a function of frequency in an ideal square wave, and are even more suppressed in a quasi-square trapezoidal wave, can be increased where desired in a controlled manner. Further, the clamping circuit provides for fast exponential charge and discharge modes of operation which significantly decrease the bipolar transition interval, thereby increasing the efficiency of operation and allowing for the transmission of discrete higher frequency components across a broad frequency spectrum in a wave which approaches an ideal square wave.

For the purposes of print clarity, the equations provided above are again stated below on pages 30a, 30b and 30c.

$$v_x(t) = I_s\left(\frac{1}{\omega_2 C} e^{-\sigma_2 t}\sin(\omega_2 t)\right) + V_s \tag{1}$$

$$i_x(t) = I_s e^{-\sigma_2 t}\left(\cos(\omega_2 t) - \frac{\sigma_2}{\omega_2}\sin(\omega_2 t)\right) \tag{2}$$

where $$\omega_2 = \sqrt{\frac{1}{LC} - \left(\frac{R}{2L}\right)^2} \tag{3}$$

$$\sigma^2 = \frac{R}{2L} \tag{4}$$

$$v_x(t) = V_s \tag{5}$$

$$i_x = (t, I_x) = \frac{V_s}{R} + \left(I_x - \frac{V_s}{R}\right)e^{-\sigma_1 t} \tag{6}$$

$$v_x(t) = 0 \tag{7}$$

$$i_x(t, I_x) = I_x e^{-\sigma_1 t} \tag{8}$$

where $$\sigma_1 = \frac{R}{L}$$

$$v_x(t, V_x, I_x) = V_s + A(V_x, I_x)e^{-\sigma_2 t}\sin(\omega_2 t + \phi(V, I)) \tag{9}$$

$$i_x(t, V_x, I_x) = \tag{10}$$
$$A(V_x, I_x)C\omega_2 e^{-\sigma_2 t}\left(\cos(\omega_2 t + \phi(V_x, I_x)) - \frac{\sigma_2}{\omega_2}\sin(\omega_2 t + \phi(V_x, I_x))\right)$$

where $$\phi(V_x, I_x) = \operatorname{atan}\left[\left(\left[\frac{-I_x}{\omega_2 C(V_x - V_s)} + \frac{\sigma_2}{\omega_2}\right]\right)^{-1}\right] \tag{11}$$

$$A(V_x, I_x) = \frac{V_x - V_s}{\sin(\phi(V_x, I_x))} \tag{12}$$

$$i_x(t) = e^{-\sigma_2 t}\left(i_x(0)\cos(\omega_2 t) + \left(\frac{v_x(0)Li_x(0)\sigma_2}{L\omega_2}\right)\sin(\omega_2 t)\right) \tag{13}$$

$$v_x(t) = e^{-\sigma_2 t}\left(v_x(0)\cos(\omega_2 t) - \left(\frac{i_x(0) - Cv_x(0)\sigma_2}{C\omega_2}\right)\sin(\omega_2 t)\right) \tag{14}$$

-continued $$i_x(t) = e^{-\sigma_2 t}\left(i_x(0)\cos(\omega_2 t) - \left(\frac{v_x(0) - Li_x(0)\sigma_2}{L\omega_2}\right)\sin(\omega_2 t)\right) \tag{15}$$

$$v_x(t) = e^{-\sigma_2 t}\left(v_x(0)\cos(\omega_s t) - \left(\frac{i_x(0) - Cv_x(0)\sigma_2}{C\omega_2}\right)\sin\omega_2 t\right) \tag{16}$$

$$v_x(t) = -V_{clamp} \tag{17}$$

$$i_x(t) = \left(i_x(0) + \frac{V_{clamp}}{R}\right)e^{-\sigma_1 t} - \left(\frac{V_{clamp}}{R}\right) \tag{18}$$

I claim:

1. A pulse generator for energizing a coil with periodic bipolar current pulses having a generally square waveform comprising bipolar transition intervals defining successive edges of unipolar current pulse intervals of alternating frequency, the pulse generator comprising a resonant DC to AC converter circuit including a DC input and an output coupled to the coil, a control circuit for controlling the switching of the converter, a resonant capacitor connected in parallel across the DC input, and decoupling means for decoupling the resonant capacitor from the DC input when the voltage across the resonant capacitor exceeds that of the DC input, the converter circuit further including first and second resonant charging sub-circuits in which the capacitor is connected to resonate with the coil for allowing the amplitude of the coil current to increase, first and second resonant discharging sub-circuits in which the capacitor is connected to resonate with the coil for allowing the amplitude of the coil current to decrease, first and second free-wheeling sub-circuits in which the resonant capacitor is effectively isolated from the coil and a short circuit current path is provided for allowing the amplitude of the coil current to gradually decrease, and an exponential charging circuit in which the DC input is electrically connected to the coil so as to allow for a rise in current through the coil, the control circuit being arranged to control the amplitude and frequency content of the generally square waveform by switching the converter circuit to operate between at least two of the above sub-circuit types in at least one controlled switching cycle during the unipolar current pulse intervals.

2. A pulse generator for energizing a coil with periodic bipolar current pulses having a generally square waveform comprising bipolar transition intervals defining successive edges of unipolar current pulse intervals of alternating frequency, the pulse generator comprising a resonant DC to AC converter circuit including a DC input and an output coupled to the coil, a control circuit for controlling the switching of the converter, a resonant capacitor connected in parallel across the DC input, and decoupling means for decoupling the resonant capacitor from the DC input when the voltage across the resonant capacitor exceeds that of the DC input, the converter circuit further including first and second resonant charging sub-circuits in which the capacitor is connected to resonate with the coil for allowing the amplitude of the coil current to increase, first and second resonant discharging sub-circuits in which the capacitor is connected to resonate with the coil for allowing the amplitude of the coil current to decrease, an exponential charging circuit in which the DC input is electrically connected to the coil so as to allow for a rise in current through the coil, and a clamping circuit shunted across the DC voltage source, the clamping circuit being arranged to supply a substantially constant DC voltage to the coil which is higher than that of the DC input.

3. A pulse generator according to claim 2 which includes first and second freewheeling sub-circuits in which the resonant capacitor is effectively isolated from the coil and a short circuit current path is provided for allowing the amplitude of the coil current to gradually decrease, the control circuit being arranged to control the amplitude and frequency content of the square waveform by switching the converter circuit to operate between at least two of the sub-circuit types in at least one controlled switching cycle during the unipolar current pulse intervals.

4. A pulse generator according to claim 3 in which the control circuit is arranged to control the amplitude and frequency content of the square waveform by switching the converter circuit to operate between at least three of the above sub-circuit types in at least one controlled switching cycle during the unipolar current pulse intervals.

5. A pulse generator according to claim 1 in which the DC to AC converter circuit comprises a full bridge inverter having first and second switching arms, the first switching arm having first and second controlled switches and the second switching arm having third and fourth controlled switches, with first, second, third and fourth diodes being connected in anti-parallel across the respective first, second, third and fourth controlled switches to provide corresponding first, second, third and fourth switch-diode pairs.

6. A pulse generator according to claim 5 in which the first resonant charging sub-circuit comprises the first controlled switch, the coil, the third controlled switch and the resonant capacitor, and the second resonant charging sub-circuit comprises the second controlled switch, the coil, the fourth controlled switch and the resonant capacitor.

7. A pulse generator according to claim 5 in which the first resonant discharging sub-circuit comprises the second diode, the coil, the fourth diode and the resonant capacitor, and the second resonant discharging sub-circuit comprises the third diode, the coil, the first diode and the resonant capacitor.

8. A pulse generator according to claim 5 in which the first freewheeling sub-circuit comprises the first controlled switch, the coil, and the fourth diode, or the second diode, the third controlled switch and the coil, and the second freewheeling sub-circuit comprises the second controlled switch, the coil, and the third diode, or the first diode, the fourth controlled switch and the coil.

9. A pulse generator according to claim 2 in which the clamping circuit includes a clamping capacitor and switching means for controlling the operation of the clamping capacitor, the capacitor being sized to supply the substantially constant DC voltage.

10. A pulse generator according to claim 9 in which the clamping circuit forms part of a fast exponential charging circuit for charging the coil, and a fast exponential discharging circuit for discharging the coil into the clamping capacitor.

11. A pulse generator according to claim 10 in which the DC to AC converter circuit comprises a full bridge inverter having first and second switching arms, the first switching arm having first and second switching arms, the first switching arm having first and second controlled switches and the second switching arm having third and fourth controlled switches, with first, second, third and fourth diodes being connected in anti-parallel across the respective first, second, third and fourth controlled switches to provide corresponding first, second, third and fourth switch-diode pairs, and the fast exponential charging circuit comprises the clamping capacitor, a fifth controlled switch forming part of the switching means, the first switch, the coil and the third switch.

12. A pulse generator according to claim 11 in which the fast exponential discharging circuit comprises a fifth diode in anti-parallel with the fifth controlled switch, the clamping capacitor, the second diode, the coil and the fourth diode.

13. A pulse generator according to claim 10 in which the fast exponential charging and fast exponential discharging circuits are arranged to operate during the bipolar transition interval, in combination with the resonant charge and discharge circuits.

14. A method of generating a series of periodic bipolar current pulses having a generally square waveform comprising bipolar transition intervals defining successive edges of unipolar current pulse intervals of alternating frequency, by using a resonant DC to AC converter having a DC input, an output coupled to a coil, and a resonant capacitor connected in parallel across the input and arranged to form a resonant circuit in conjunction with the coil, the method including the steps of controlling the amplitude and frequency content of the square waveform by operating the pulse generator in a resonant charging mode, in which the resonant capacitor is connected to resonate with the coil for allowing the amplitude of the coil current to increase, a resonant discharging mode in which the capacitor is connected to resonate with the coil for allowing the amplitude of the coil current to decrease, an exponential charging mode, in which the DC input is electrically connected to the coil, and a freewheeling mode in which the resonant capacitor is effectively isolated from the coil and a short circuit current path is provided for allowing the amplitude of coil current to gradually decrease.

15. A method according to claim 14 which includes the step of operating the pulse generator in a fast charging mode in which the coil is charged via a clamping circuit which is connected in parallel across the DC input, and is arranged to supply a substantially constant DC voltage which is higher than the DC input, and a fast exponential discharging mode in which the coil discharges into the clamping circuit.

16. A method according to claim 15 which includes the step of clamping the coil voltage, operating the pulse generator in the fast discharging mode by commutating the coil current to the clamping circuit, and subsequently operating the clamping circuit in the fast charging mode when the polarity of the clamping current changes.

17. A method according to claim 14 in which the method includes the steps of providing at least one controlled switching cycle during each unipolar pulse interval, each switching cycle including a charging interval, and a discharging interval corresponding to the aforesaid modes.

18. A method according to claim 17 in which each switching cycle further includes fast exponential charging and discharging intervals.

19. A method according to claim 17 in which each switching cycle includes slow exponential charging and discharging intervals.

20. A method according to claim 17 in which two to five switching cycles are provided, with each cycle being a PWM-controlled cycle.

21. A method according to claim 17 which includes the steps of operating the pulse generator, during each bipolar transition interval, in at least the resonant charging and resonant discharging modes.

22. A method of generating a series of periodic bipolar current pulses having a generally square waveform comprising bipolar transition intervals defining successive edges of unipolar current pulse intervals of alternating frequency, by using a resonant DC to AC converter having a DC input, an output coupled to a coil, and a resonant capacitor connected in parallel across the input and arranged to form a resonant circuit in conjunction with the coil, the method including the steps of controlling the amplitude and frequency content of the square waveform by operating the pulse generator in a resonant charging mode, in which the resonant capacitor is connected to resonate with the coil for allowing the amplitude of the coil current to increase, a resonant discharging mode in which the capacitor is connected to resonate with the coil for allowing the amplitude of the coil current to decrease, a fast charging mode in which the coil is charged via a clamping circuit which is connected in parallel across the DC input and a fast discharging mode in which the coil discharges into the clamping circuit.

23. A method according to claim 22 which includes the steps of operating the pulse generator, during each bipolar transition interval, in at least the resonant discharge, fast discharge, fast charge and resonant charge modes.

24. A method according to claim 22 which includes the step of operating the pulse generator, during each bipolar transition interval, in a quiescent mode in which no current flows in the coil, which is effectively disconnected in this mode.

* * * * *

UNITED STATES PATENT AND TRADEMARK OFFICE
CERTIFICATE OF CORRECTION

PATENT NO. : 6,028,760
DATED : February 22, 2000
INVENTOR(S) : Jan Abraham Ferreira It is certified that error appears in the above-identified patent and that said Letters Patent is hereby corrected as shown below:

On the title page: Item [73] Assignee, is to be deleted.

Signed and Sealed this

Fifth Day of September, 2000

Attest:

Attesting Officer

Q. TODD DICKINSON

Director of Patents and Trademarks